US012670711B1

(12) United States Patent
Bradley

(10) Patent No.: US 12,670,711 B1
(45) Date of Patent: Jun. 30, 2026

(54) ARTIFICIAL INTELLIGENCE SYSTEM AND MACHINE LEARNING METHOD FOR ELECTRICAL GRID MANAGEMENT USING UNMANNED AERIAL VEHICLE TRAFFIC DATA COLLECTION

(71) Applicant: Logan W. Bradley, Arlington, VA (US)

(72) Inventor: Logan W. Bradley, Arlington, VA (US)

( * ) Notice: Subject to any disclaimer, the term of this patent is extended or adjusted under 35 U.S.C. 154(b) by 294 days.

(21) Appl. No.: 18/487,189

(22) Filed: Oct. 16, 2023

Related U.S. Application Data

(63) Continuation-in-part of application No. 17/582,144, filed on Jan. 24, 2022, now Pat. No. 12,079,015.

(51) Int. Cl.
| | |
|---|---|
| *G06V 20/17* | (2022.01) |
| *G05D 1/69* | (2024.01) |
| *G06V 10/70* | (2022.01) |
| *G06V 20/10* | (2022.01) |
| G05D 105/80 | (2024.01) |
| G05D 109/20 | (2024.01) |

(52) U.S. Cl.
CPC ............. *G06V 20/188* (2022.01); *G05D 1/69* (2024.01); *G06V 10/70* (2022.01); *G06V 20/17* (2022.01); *G05D 2105/89* (2024.01); *G05D 2109/20* (2024.01)

(58) Field of Classification Search
CPC ...... G06V 20/188; G06V 20/17; G06V 10/70; G05D 1/69; G05D 2109/20; G05D 2105/89
See application file for complete search history.

(56) References Cited

U.S. PATENT DOCUMENTS

| | | | |
|---|---|---|---|
| 2018/0046910 A1 * | 2/2018 | Greene | G06N 5/022 |
| 2018/0348766 A1 * | 12/2018 | Lewis | G05D 1/227 |
| 2020/0250424 A1 * | 8/2020 | Klein | G06T 7/13 |
| 2021/0034866 A1 * | 2/2021 | Appel | G06V 20/20 |
| 2021/0173414 A1 * | 6/2021 | Starr | G08G 5/56 |
| 2021/0374111 A1 * | 12/2021 | Harvey | G01C 21/3837 |

* cited by examiner

*Primary Examiner* — Syed Haider

(57) ABSTRACT

An artificial intelligence system including a machine learning module for assisting in electrical grid maintenance. The machine learning module receiving data sets from UAVs travelling in the proximity of power lines and communicating sensed observations to a data library for training the module to spot markers of potential hazards and calculating a probability of hazards occurring under various conditions. The system communicating hazards of a type or above a predetermined level of probability to a communication center or utility company to remediate or schedule preventative maintenance.

11 Claims, 9 Drawing Sheets

200

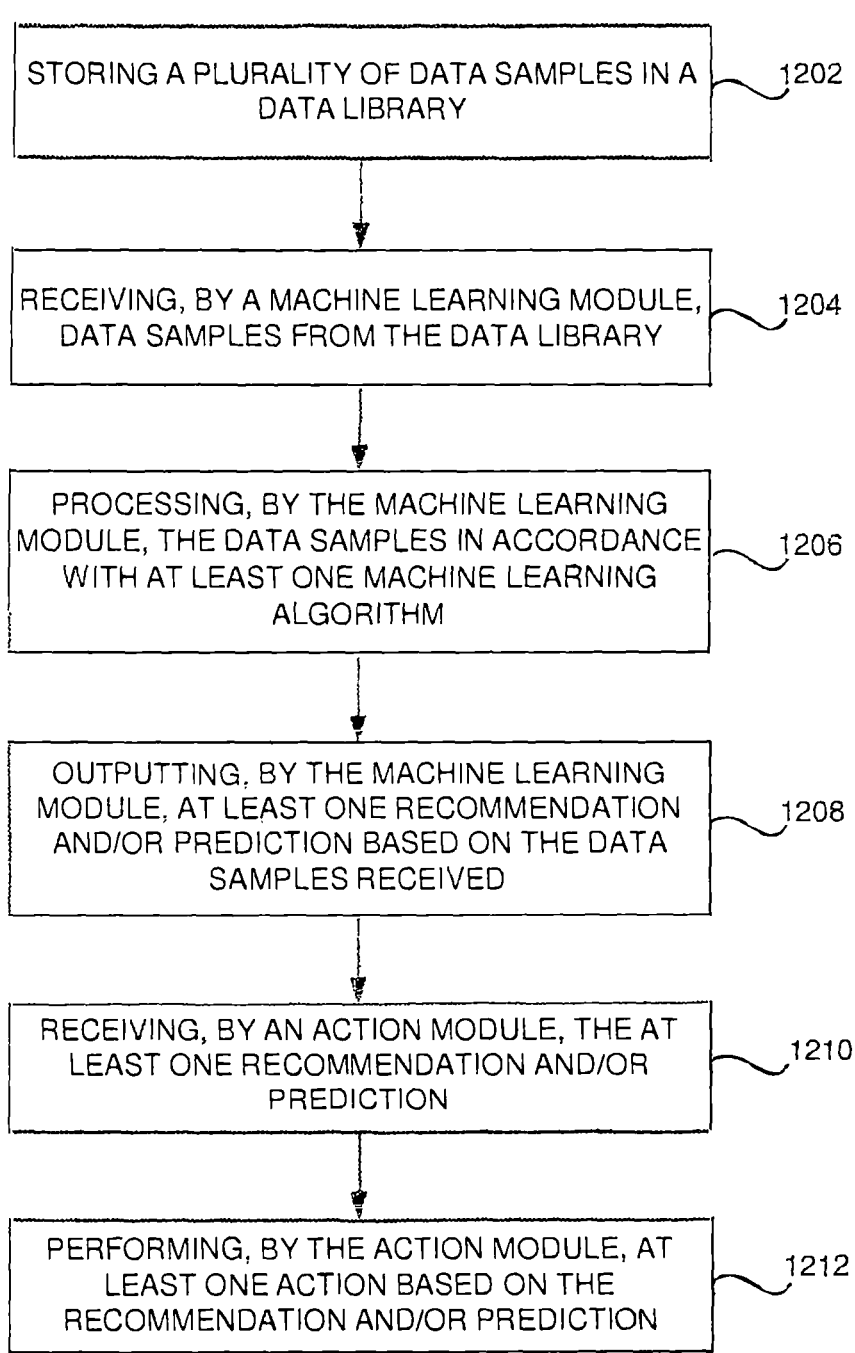

STORING A PLURALITY OF DATA SAMPLES IN A DATA LIBRARY ⎯ 1202

RECEIVING, BY A MACHINE LEARNING MODULE, DATA SAMPLES FROM THE DATA LIBRARY ⎯ 1204

PROCESSING, BY THE MACHINE LEARNING MODULE, THE DATA SAMPLES IN ACCORDANCE WITH AT LEAST ONE MACHINE LEARNING ALGORITHM ⎯ 1206

OUTPUTTING, BY THE MACHINE LEARNING MODULE, AT LEAST ONE RECOMMENDATION AND/OR PREDICTION BASED ON THE DATA SAMPLES RECEIVED ⎯ 1208

RECEIVING, BY AN ACTION MODULE, THE AT LEAST ONE RECOMMENDATION AND/OR PREDICTION ⎯ 1210

PERFORMING, BY THE ACTION MODULE, AT LEAST ONE ACTION BASED ON THE RECOMMENDATION AND/OR PREDICTION ⎯ 1212

FIG. 8

ARTIFICIAL INTELLIGENCE SYSTEM AND MACHINE LEARNING METHOD FOR ELECTRICAL GRID MANAGEMENT USING UNMANNED AERIAL VEHICLE TRAFFIC DATA COLLECTION

CROSS REFERENCE TO RELATED APPLICATIONS

This application is a continuation-in-part of U.S. Ser. No. 17/582,144 filed on Jan. 24, 2022, which claims the benefit of priority under 35 U.S. C. 119(e) to U.S. Provisional No. 63/206,277 filed on Jan. 27, 2021, the entire contents of which are hereby incorporated by reference in their entirety.

FIELD OF THE INVENTION

The present disclosure generally relates to unmanned aerial vehicles (UAVs) or other battery-powered craft. More specifically, the present disclosure relates to the use of UAVs in the proximity of power and electrical lines to gather data for an artificial intelligence system and machine learning tool to aid in electrical grid and forestry management.

BACKGROUND OF THE INVENTION

The use of lightweight, unmanned aerial vehicles (UAV) has become increasingly more common in recent years. Many, if not most, of these craft utilize non-combustion materials, typically rechargeable battery cells, as a power source. Drones, for example, are destined to become ubiquitous in modern society as the capabilities and uses of these craft continue to expand as advancements in the art of controlling and navigating these craft continuing to evolve. Product suppliers and shippers, such as Amazon.com, have indicated an intention to utilize a fleet of drones for the purposes of expeditious delivery of merchandise and other materials through the air. Drones have the advantage of not having to be sized nor safe enough for human passengers, which provides many options in design and facilitates the use of batteries as a power source.

As will be appreciated by one of ordinary skill in the art, while battery power presents a safe alternative to fossil fuels in the event of an accident or otherwise, current battery technology places an inherent limit to the distance UAVs such as delivery drones can fly before needing to be recharged. As such, the delivery distance from a home base of such a drone is greatly limited and presents a significant drawback in the art. Other drawbacks in the art recognized by the inventor includes the need to have sufficient power or battery life to allow the drone to return to its starting point for recharging, essentially cutting the service radius of the drone in half. Additionally, the lack of recharging facilities limits the areas of use of drones as well as presenting a capital expenditure in infrastructure that may prove cost prohibitive in most circumstances.

Yet another drawback of current UAV technology relies in remote control and navigation is remote areas or for extended distances. As will be appreciated, maintaining a direct connection with a UAV is problematic as the distance between the controller and UAV grow; and UAVs with GPS technology may be limited in areas with poor or nonexistent cellular reception or limited to UAVs having very expensive and difficult to procure satellite navigation communications.

The foregoing highlights some of the problems with conventional UAV or UAV technology as it exists today and as recognized by the present inventor. Furthermore, the foregoing highlights the present inventor's recognition of long-felt, yet unresolved needs in the art for a UAV with a vast service radius. In addition, the foregoing highlights the inventor's recognition of a need in the art for providing access to recharging services for UAVs remote from their home base or launch site. The foregoing also highlights the present inventor's recognition of the need for a cost-effective UAV recharging infrastructure that allows UAVs to be used in remote areas. Finally, the foregoing highlights the present inventor's recognition of the need for a reliable and inexpensive method for UAV navigation in remote areas.

The present inventor also recognized that UAV traffic along predetermined routes, especially in proximity to electrical power lines provides a heretofore unavailable source of data collection for training a machine learning module for identification or predictive analysis of a phenomena or event, such as potential events, anomalies, and maintenance needed for the power grid.

SUMMARY OF THE INVENTION

Various embodiments of the present disclosure overcome various of the aforementioned and other drawbacks associated with conventional UAVs (e.g., drones) and the like (e.g., electric powered vehicles) and offers new advantages as well.

The present disclosure is based, in part, on the present inventor's recognition of a need in the art to increase the service distance of a UAV. To this end, the present inventor recognized that the electrical infrastructure, or grid, of modern civilization's power systems presents access to electricity that flows through thousands and thousands of miles of, mainly, above-ground wires. As will be appreciated, these wires, and the towers and poles that suspend them, often span even the remotest and sparsely populated areas of the United States (and other jurisdictions around the world).

The present disclosure is also based, in part, on the present inventor's recognition that the electrical grid could be manipulated or harnessed to provide power to recharge the power supplies or batteries of battery-powered craft.

The present disclosure is also based, in part, on the present inventor's recognition that the heat and/or magnetic energy produced by electricity flowing through the electrical grid infrastructure could be used in a manner akin to a roadmap for navigation purposes.

The present disclosure is also based, in part, on the present inventor's recognition that UAV traffic in the proximity of the electrical grid allows for the regular and widespread collection of visual and non-visual data for training a machine learning module to identify and/or forecast potential events, anomalies, or maintenance needed for portions of the power grid. The data in various embodiments include a single UAV collecting and training a machine learning module from regular observations and collections of data along a regularly traversed portion of the grid, and/or a fleet of UAVs operating throughout the electrical grid and pooling their data from individual observations and collections to train a machine learning module to identify or predict a phenomena or event affect the electrical grid or area nearby.

While the present disclosure will be described in more detail in connection with the example of recharging and navigating DC-battery powered unmanned aerial drones, it should be appreciated that the aspects described herein are applicable to numerous devices, fields, and uses and all of such variations should be understood to be part of the present invention. For example, non-aerial battery-powered craft could be adapted to make use of various advantageous features of the present disclosure.

According to one aspect of various embodiments of the present disclosure, there is provided a UAV having a means for receiving a charge from the electrical lines, towers, or utility poles of the electrical power grid. According to the invention, the recharging can be active or passive. According to an aspect of passive charging, a UAV can make use of inductive charging by parking or flying in proximity to electrical power lines, towers, and/or poles. According to an active charging aspect of the present disclosure, there is provided an electrical grid component having means for providing a charge to a UAV. In some advantageous embodiments, the UAV includes a plug mechanism or plug receiving mechanism to electrically couple to a plug receptacle or plug of a charging area associated with a power line, transmission tower or distribution pole. In a preferred embodiment, a charging station is physically and electrically attached to an electrical tower or utility pole for receiving a UAV. The charging station may comprise a landing pad having a plug receptacle configured to receive a corresponding plug member provided on a UAV. Alternatively, the charging station may have a plug for mating with a receptacle provided on a UAV or vice versa. According to some embodiments, the landing pad provides a landing surface for a UAV to land and receive an electrical charge provided by parasitic removal of electricity from the power lines associated with the tower, pole, or line associated with the charging station.

In other advantageous embodiments, the UAV is configured for inductive charging and recharges at one of any induction recharging areas associated with power lines, towers, or poles. In certain embodiments, the induction recharging area comprises and induction plate preferably having a landing pad. The induction plate is configured to receive a UAV and provide electricity sufficient to allow for inductive charging of a UAV parked on the plate according to methods known in the art. For example, the UAV and plate may comprise cooperating coils or antennas that use frequency modulation or the like to inductively charge the UAV's batteries through associated circuitry. In other embodiments, the UAV may be equipped with a toroidal coil or other electromagnetic components and pass over the power lines in near proximity in order to receive an electric charge for its batteries. As will be appreciated, in a coil embodiment, by virtue of natural phenomena, the coil will receive a charge when brought in the vicinity of the power lines or related equipment from the magnetic current generated by the electricity passing through the power lines and equipment. Accordingly, in some embodiments the UAV is recharged through induction via a toroidal coil. In some other embodiments, the toroidal core surrounds an electric power line and generates AC power that is received and rectified into DC power for recharging the UAV's batteries. In any event, as will be appreciated, inductive charging through proximity to the magnetic field generated by the electricity passing through power lines allows for the UAV to be charged in flight.

With inductive embodiments, a landing pad may or may not be used depending on the specific application and configuration of the UAV. Likewise, the recharging may be using the power lines as they normally exist or a special wire may be deployed extending a length in the area of the towers to serve as the source of electricity for the toroidal coil or other inductive charging components. Inductive charging is well understood in the art for both high and low voltage applications and both should be understood to be within the scope of the present invention. Likewise, magnetic energy harvesting by surrounding an electrical wire with a toroidal core is well understood in the art as Farraday's law of induction applies.

In embodiments where a landing pad is used, the present disclosure should be understood to include any pad of any suitable size, shape, or material. The same holds true for those embodiments using an induction plate. It is well within the ability of one of ordinary skill in the art to configure a suitable landing pad, induction plate, and/or charging station to achieve many of the advantages of the present disclosure. For example, certain materials of construction may be advisable based on the climate of the area, electric codes, or other reasons.

Likewise, weep holes, roofing, wind breaks, and other countermeasures for the elements commonly associated with outdoor electrical equipment or otherwise may be advantageously used with the embodiments herein and should be understood to be within the scope of the invention. Similarly, grounding, shielding, isolators, and other advantageous or necessary safety equipment when connecting equipment or devices with or near power lines should be used where proper, whether required by code or not. Preferably, where necessary, landing pads should be configured, isolated, or protected from being accessible, a fire hazard, and/or leading to the electrocution wildlife. Similarly, UAVs should be appropriately configured to protect internal components from electrical phenomena associated with high voltage power lines such as arcing and flashing.

In various preferred embodiments, the recharging area will include a communications unit. The communications unit may comprise one or both of the functionalities of communications with the grid and/or communications with the UAV traffic. As will be appreciated, it may be necessary or advantageous in certain embodiments to integrate the recharging area into the communications network of the electrical grid, or "smart grid." This may be important to prevent a landing UAV that will be drawing power from the grid to be perceived as a fault in the line causing the safety systems to isolate the perceived fault and black out the area. In a presently preferred embodiment, the communication unit, much like a recloser, can identify to the system that a landing UAV is not a fault and the safety systems do not need to shut down power to the line. In other embodiments, the recharging area may be configured to receive electrical power in a manner that removes it from having fluctuations being registered or identified by the grid's safety devices, for example, in a manner similar to lights provided on utility poles.

In embodiments wherein the communications unit communicates with the units to be recharged, any suitable means of communication and coordination should be understood to be within the scope of the invention. One of ordinary skill in the art armed with the present application can easily implement a communications network and protocol to achieve various advantages of the present invention. As will be appreciated, a communications network may serve many purposes, either as an integrated single device or central system having various functions or various discrete communications systems provided in the overall system where necessary or desired.

According to some embodiments of the disclosure, the communications unit may be a relatively simple system that allows for the recharging system to download or otherwise communicate information regarding a UAV using it for recharging. The communications unit may receive information sufficient to identify the UAV or its owner and track how much electricity was consumed in recharging to allow the system to invoice for the service. Similarly, the communications unit may separately, or in addition to identifying the UAV and consumption, communicate directly with an incoming UAV. The communications may be as simple as letting a UAV know that the charging area is free of traffic and open for landing. Alternatively, the communications may be more complex and involve two-way communications, scheduling, and the like. In some embodiments, the communications system may communicate with the UAV only by reading an RFID tag or the like to identify the UAV and its requirements. In other embodiments, the UAV and charging area may communicate using radio, Wi Fi, PLC, or long-range systems to coordinate location and even scheduling and the like. In some embodiments, the UAVs and charging stations are part of an integrated communications network that allows the locations of the charging stations and their status communicated to UAVs and/or as part of an overall air traffic control system configured to track UAVs, their travel, and their recharging.

In a presently preferred embodiment, the communication system is configured to communicate with both the electrical grid and the UAV/UAV traffic. Communications with the UAV traffic is preferably multifaceted as discussed above. The communications with the electrical grid are similarly multifaceted as part of the "smart grid" or a SCADA to coordinate with safety equipment to prevent false alarms and well as track their usage and their overall health for preventative maintenance and replacement.

According to another advantageous feature of various embodiments of the present disclosure, the UAV may be equipped to use the magnetic field or heat pattern of the electrical grid for navigation. For example, the UAV may have a map of the electrical grid and be able to detect and use the heat or magnetic output of the power lines and equipment to find its location and then follow these indicators as a map in order to navigate to its destination in areas or in UAVs not equipped with GPS or satellite navigation. Preferably, the UAVs can follow the mapping of the electrical grid to their ultimate destination down to an individual address if necessary. In accordance with one embodiment, the UAV is provided with a navigation module and data collectors including a camera module and a magnetic detector that allows for detection of the magnetic output of the electrical grid. In some embodiments, the UAV is provided with a navigation module and data collectors that include a heat detector that allows for detection of the heat generated by resistance in power lines in order to navigate using the electrical grid. In yet other embodiments, a UAV is equipped with data collectors that include having the ability to sense both heat and/or magnetic energy.

According to another advantageous feature of various embodiments on the disclosure, one of more UAVs may be equipped to collect and store data, or transmit data gathered during its flight. The UAV may be configured to upload or otherwise communicate to the system upon completing its flight, and/or may communicate the data at a recharging station during its trip. The data may be used as part of an artificial intelligence system and/or machine learning system. The system may comprise a data library for storing data received from UAV transmissions or from data uploaded from docked UAVs. The system may also comprise a machine learning module for executing one or more machine learning algorithms or functions of the data, and an action module for receiving output or data from the machine learning module and performing or recommending an action based on the output. As will be appreciated, in some embodiments a single UAV collects data and uses real-time collection in the system. In other embodiments, a single UAV may also use data collected during a regular or repeated flight plan to allow historical data and anomalies to be used in the system. The system may compare historical data of vegetation growth to extrapolate (or predict) the growth to a point likely to damage the power line within a given time frame. A power line hazard may be a condition causing, or likely to cause, a short between two power lines, between a live power line and ground (or any other structure or plant).

In a preferred embodiment, UAVs traversing parts of the electrical grid are constantly supplying data to the system to allow data in various different geographies with varying weather condition, foliage and other local environmental conditions to be used in the system to provide machine learning to better predict or identify phenomena or things of interest that may be encountered in a different area by a different UAV. Such things of interest may include encroaching or dying foliage, weather susceptible foliage or debris, encroaching wildlife and nests, fire hazards, failing or aging electrical lines and equipment, and other electrical grid related concerns.

The inventive aspects of the present disclosure as described and claimed herein should become evident to a person of ordinary skill in the art given the following enabling description and drawings. The aspects and features of the present disclosure believed to be novel and other elements characteristic of the advantageous aspects of the disclosure described herein are set forth with particularity in the appended claims. The drawings are for illustration purposes only and are not necessarily drawn to scale unless otherwise indicated. The drawings are not intended to limit the scope of the disclosure. The following enabling disclosure is directed to one of ordinary skill in the art and presupposes that those aspects of the disclosure within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred embodiments and reference to the accompany drawings wherein:

FIG. 8 is a block diagram of a method for using the data collection and machine learning and artificial intelligence system of FIG. 7.

DETAILED DESCRIPTION

Exemplary presently preferred embodiments of a system according to various advantageous features of the recharging and navigation aspect of the disclosure and the artificial intelligence system described herein are depicted in FIGS. 1-8.

Figure 1:
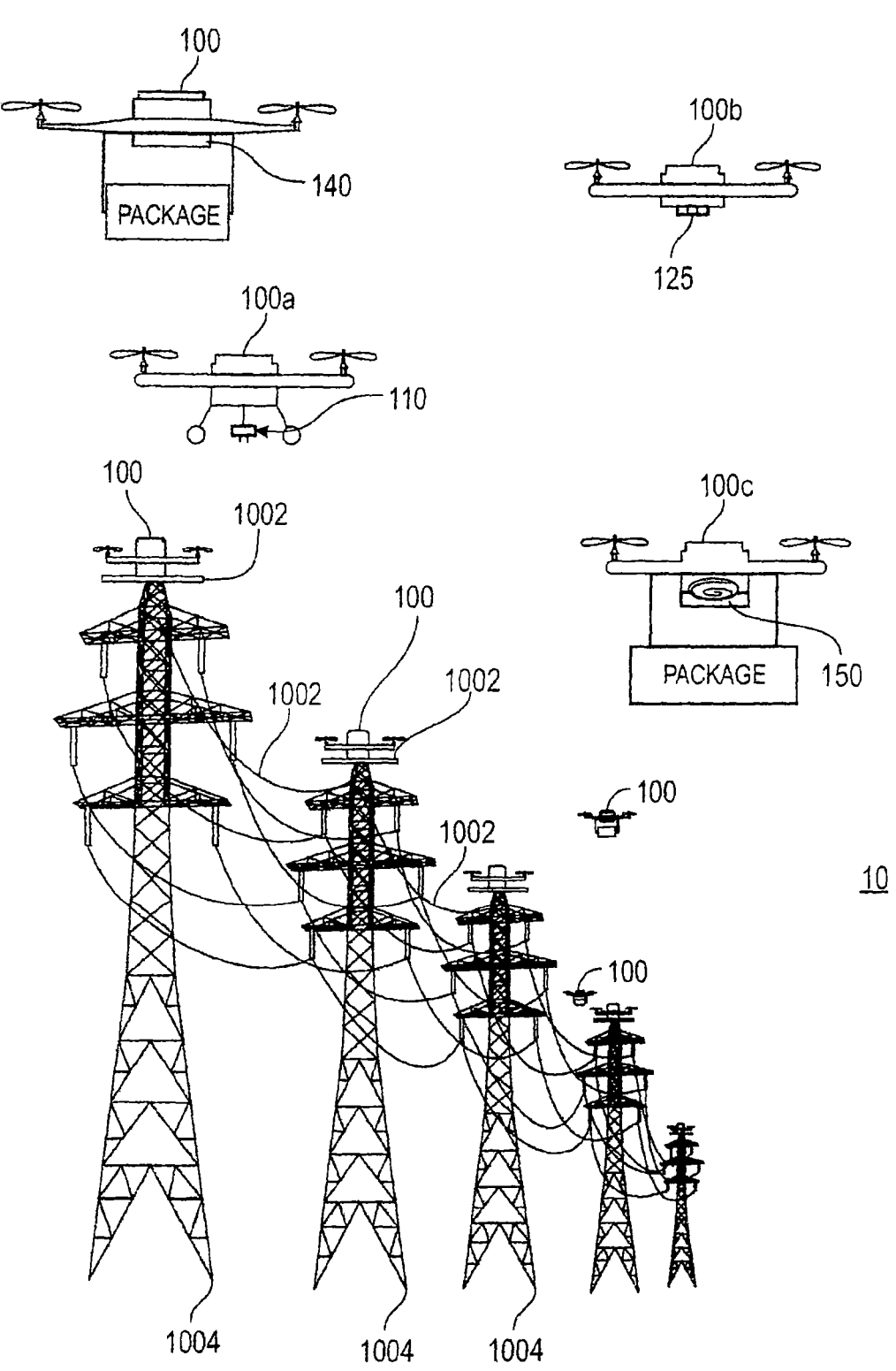
FIG. 1 depicts a two-dimensional drawing of an environment view of an embodiment of UAV traffic using components of the electrical grid according to various advantageous features of various embodiments of the present invention.

FIG. 1 is a depiction of an environment 10 that includes a plurality of UAVs 100 embodying various features of various aspects of the present invention. Various embodiments of the UAVs 100 have a rechargeable power supply 140. As depicted in operation, the UAVs 100 use the components of an electrical grid such as transmission lines 1002, transmission towers 1004, distribution lines 1012 and utility poles 1014 and in some cases special landing pad recharging platforms 2002 for recharging, communication, and/or navigation as conceived by the present inventor.

As shown in FIG. 1, UAV 100*a* may comprise any suitable configuration, such as a quadracopter of the type known in the art, which may be further equipped with a recharging plug 110 configured for mating with a receptacle (e.g., plug receptacle 2008 of FIG. 4A) on a charging station landing pad 120. Alternatively, UAV 100*b* may have any suitable design such as a quadracopter and further including an induction charging coil for positioning over a cooperating charging coil (not shown) on a charging station landing pad 120 to facilitate induction recharging of the UAV. Also, according to an aspect of the invention, UAV 100*c* may include a toroidal coil 150 and related circuitry to allow charging to occur when the UAV is flown within the magnetic field generated by the electricity passing through the power lines. Various embodiments of the UAV 100*b* may have a female charging receptacle 125 as shown in FIG. 1.

Figure 2:
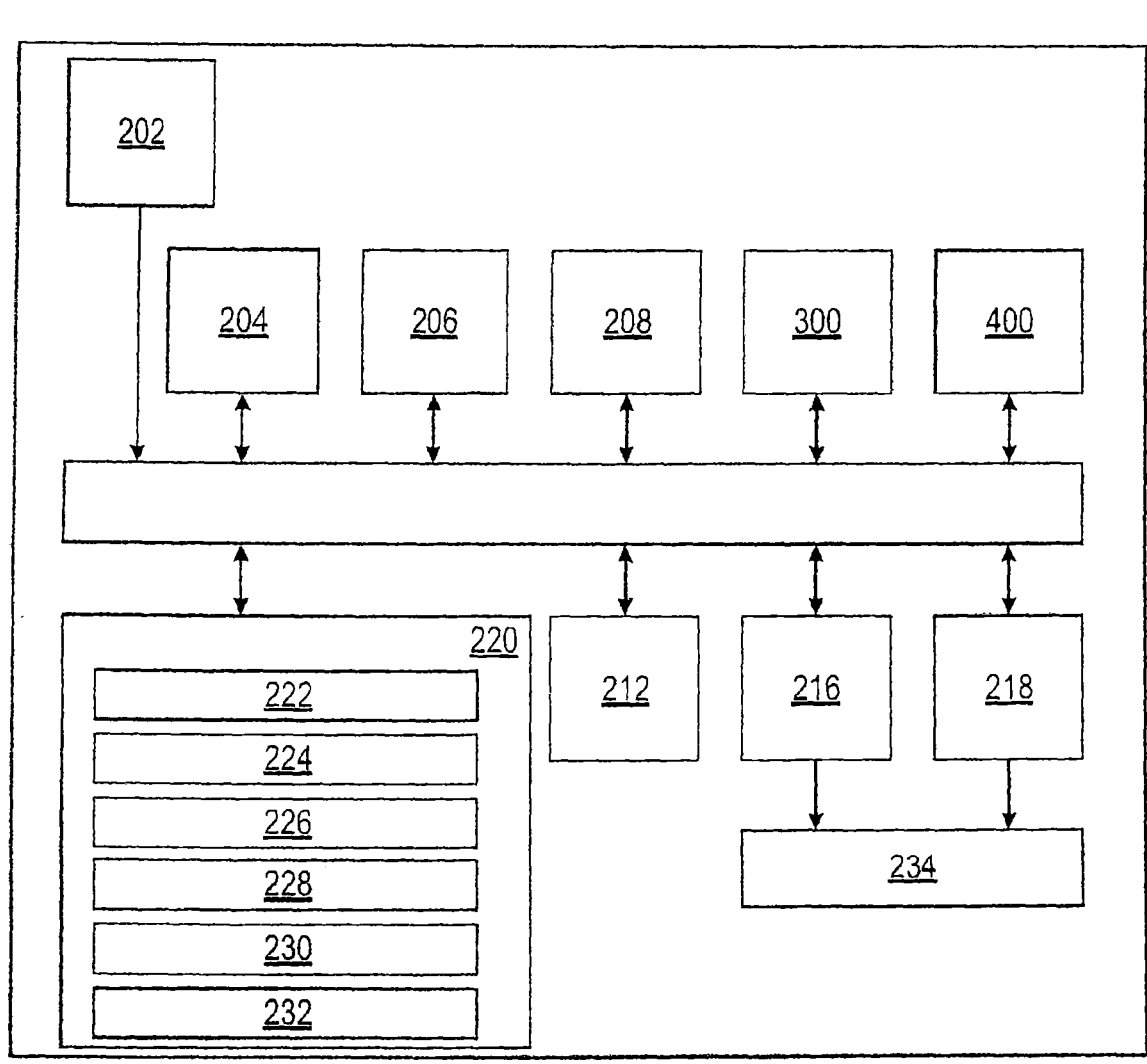
FIG. 2 depicts a block diagram of an illustrative UAV architecture of an embodiment of a UAV configured for use and embodying various advantageous features of representative embodiments of the present invention.

FIG. 2 is a block diagram of an illustrative UAV architecture 200 of a representative UAV 100 adapted for use in connection with various embodiments of the present invention. As will be appreciated, the UAV architecture 200 may be used to implement the various systems, devices, and techniques discussed above and hereinafter. In the illustrated implementation, the UAV architecture 200 includes one or more processors 202, coupled to a non-transitory computer readable media 220 via an input/output (I/O) interface 210. The UAV architecture 200 may also include a propeller motor controller 204, power supply module 206 and/or a navigation system 208. The UAV architecture 200 further includes an inventory engagement mechanism controller 212, a network interface 216, one or more input/output devices 218, a recharging module 300, and a thermal and/or magnetic detection and mapping module 400.

In various implementations, the UAV architecture 200 may be implemented using a uniprocessor system including one processor 202, or a multiprocessor system including several processors 202. The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 220 may be configured to store executable instructions/modules, data, flight paths, electronic grid mapping, and/or data items accessible by the processor(s) 202. In various implementations, the non-transitory computer readable media 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 220 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 220, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The system also preferably uses the detection 300 and mapping 400 modules to navigate when GPS is unavailable as discussed herein.

The inventory engagement mechanism controller 212 communicates with the actuator(s) or motor(s) (e.g., a servo motor) used to engage and/or disengage inventory. For example, when the UAV is positioned over a level surface at a delivery location, the inventory engagement mechanism controller 212 may provide an instruction to a motor that controls the inventory engagement mechanism to release the inventory (e.g., an item or a package). Similarly, in embodiments where a cargo hold is used, the controller 212 off-loads the item or package prior to landing on the recharging pad 2004.

The network interface 216, such as a transceiver, may be configured to allow data to be exchanged between the UAV architecture 200, other devices attached to a network, such as other computer systems, and/or with UAV control systems of other UAVs. For example, the network interface 216 may enable wireless communication via signal sources and/or directly with other UAVs. In various implementations, the network interface 216 may support communication via wireless general data networks, such as a Wi-Fi network. For example, the network interface 216 may support communication via telecommunications networks such as cellular communication networks, satellite networks, and the like. The network interface 216 also preferably communicates with communication system of recharging pads to gauge accessibility and charging data.

Input/output devices 218 may, in some implementations, include image capture devices, a magnetometer, infrared sensors, time of flight sensors, accelerometers, lights, speakers, and other input/output devices commonly used in aviation. Multiple input/output devices 218 may be present and controlled by the UAV architecture 200. One or more of these sensors may be utilized to assist in navigation, landings, and avoiding obstacles during flight.

In some embodiments, the computer readable media 220 may store a flight plan module 222, a flight controller 224, the locating component 226, and a UAV communication module, which are described in turn. The components may be stored together or in a distributed arrangement. The computer readable memory may also store data 230, such as a flight plan, signal source data, waypoints, predetermined landing sites, recharging stations, a weather forecast, and other data. The data 230 may include mapping of the electrical grid and known locations for recharging, such as tower recharging platforms to be used to execute the flight plan in coordination with the recharging module 300. The data 230 may include a complete map of the electrical grid of a locality to allow the UAV to use its detection of the heat or magnetic energy from transmission and power lines to navigate to and from a predetermined destination in cooperation with the mapping module 400. The computer readable media 220 may store charging costs 232 to the customer for payload deliveries with a portion of the costs possibly billed to the utility company for data gathering flights. Module 232 may be reserved for flight or data gathering instructions, commands and routines, or telemetry or data transmission schemes or parameters.

In operation according to a preferred embodiment, in areas where GPS or cell service is lost, the magnetometers and/or heat sensors detect power lines and track them according to a map of know power line locations. In this manner, the power lines can be followed much like a road map and allow the UAV to continue to its destination while preferably also receiving a recharging of its battery through induction.

The flight plan module 222 may receive, maintain, update, and/or create a flight plan for use by the UAV, implemented by the flight controller 224 and navigation system. The flight plan module 222 may receive inputs from the signal source analyzer 226 and may update the flight plan (or create a new one) accordingly, which may include different waypoints and/or other different navigational information.

The flight controller 224 may implement the flight plan as well as control the UAV in accordance with the navigation system 208 as described in more detail herein. The flight controller 224 may make changes in a direction or conduct of flight based on the information from the signal source analyzer 226 without necessarily receiving a change in the flight plan.

The locating component 226 may determine a location of the UAV 100 using any of the techniques described herein. In some embodiments where GPS or satellite navigation is unavailable, the locating component 226 may detect the magnetic and/or heat generated by the power lines carrying electricity in coordination with the recharging module 300 and use a map of the known location of the power lines to navigate to a desired destination in coordination with the mapping module 400.

The UAV communication module 228 may perform communications operations with the service provider (controller) and/or with other UAVs. The UAV communication module 228 may also interact with recharging platforms communications 2040 or other equipment on the electrical grid as described in more detail below.

The data 230 may include the signal source data, which may be all of or a portion of data included in a signal source data repository created and/or maintained at least in part by a service provider. The data 230 may include a whitelist (which may be included in the signal source data) that designates trusted signal sources.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Figure 3:
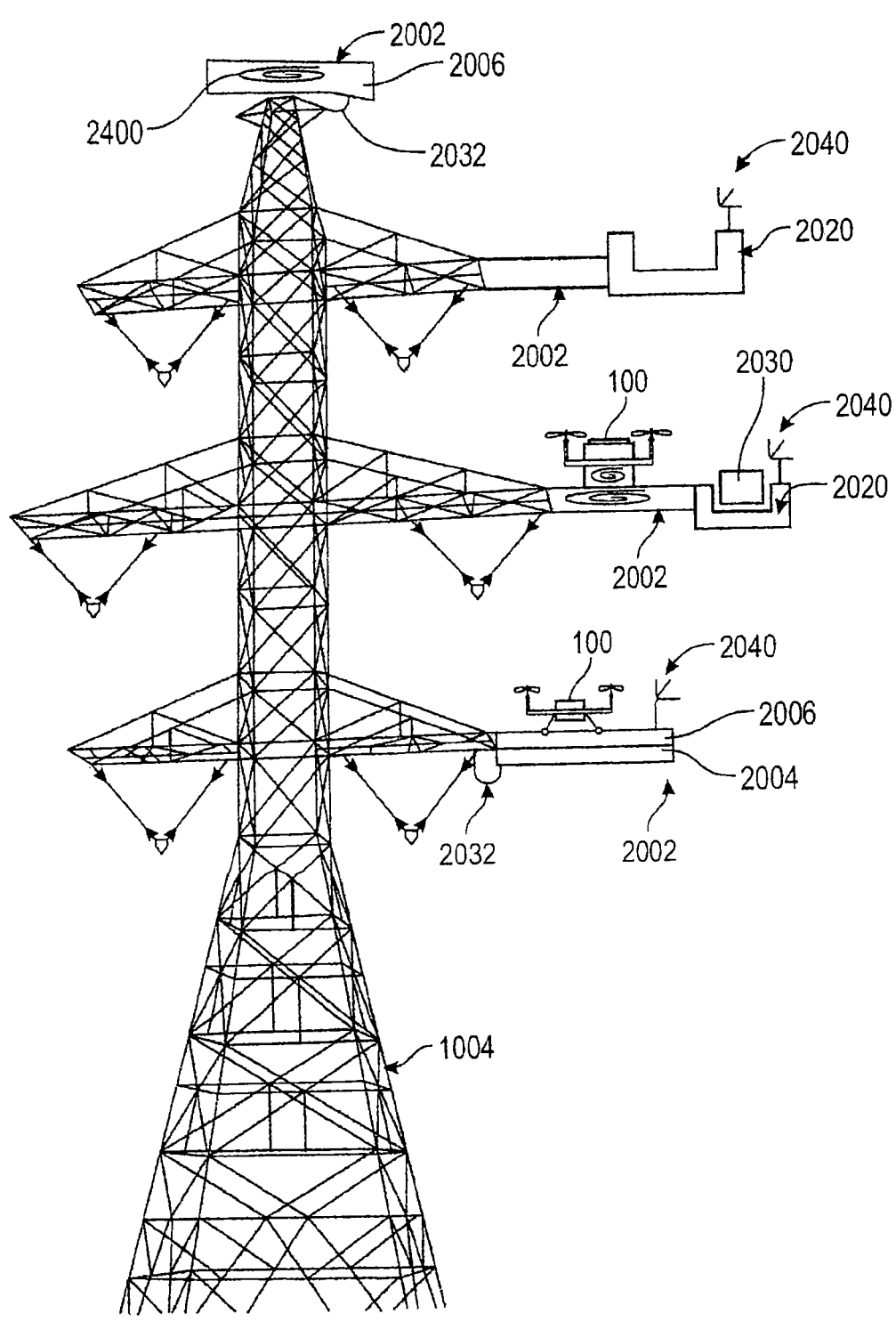
FIG. 3 depicts various embodiments on landing pads and cargo holders according to various embodiments of the present invention.

FIG. 3 is a diagram illustrating examples of landing platforms 2002 in accordance with various advantages features of various embodiments of the invention. Referring now to FIG. 3, the example includes a platform member with communications capability 2040 and battery charging capability 2004, and that should be appreciated as being capable of being selectively configured to provide direct or inductive (or both) charging capabilities for a docked UAV.

As illustrated, landing platform 2002 includes a landing floor 2006 configured to serve as a landing pad for receiving and supporting UAVs 100. The floor 2006 can be appropriately sized for a single UAV or it can be large enough for multiple UAVs. Additionally, as configured in other embodiments, multiple floors can be provided in a single landing platform location, or hub, if such UAV infrastructure along a frequent route is justified. In sum, various embodiment of landing platforms 2002 can be selectively configured to receive or support multiple UAVs and can be configured for direct or inductive charging (or both).

The landing platforms 2002 may include a cargo hold 2020 for holding cargo 2030 while the UAV recharges. The landing platforms preferably include a parasitic electrical power supply 2032 to feed electricity to the battery charger 2004 or inductive coil 2400.

Figures 4A, 4B:
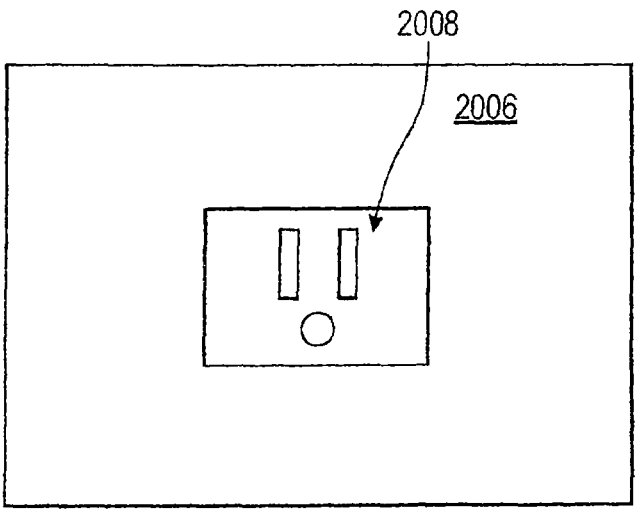
FIG. 4A is a top view of a landing platform equipped with a charging receptacle.
FIG. 4B is a top view of a landing platform having a top surface equipped with charging tines and an inductive coil deployed below the top surface.

With respect to direct charging embodiments, in a first preferred embodiment as shown in FIG. 4A, the floor 2006 can be equipped with a plug receptacle 2008 for receiving a charging prong(s) 170 provided on the UAV 100. Alternatively, as shown in FIG. 4B, the floor 2006 can be equipped with charging prongs 2010 for insertion in a charging receptacle 180 disposed on the UAV 100. Although not clearly shown, in either case, the floor 2006 may cover an inductive charging coil so either inductive or direct charging is available.

In other alternative embodiments, the floor 2006 may comprise a top surface and a bottom surface wherein each of the surfaces of floor 2006 may be implemented to include a multitude of conductive surfaces with positive and negative polarities arranged in a predetermined pattern such that when the UAV lands on the floor 2006 corresponding conductors on the docking elements (e.g., feet) 155 of the UAV 100 make the appropriate electrical contact. The predetermined pattern for these conductive surfaces on the platform can include, for example, a checkerboard pattern. The pattern can be sized and configured such that when one foot of the UAV is on a pattern element of a given polarity, the opposite foot of the UAV will be positioned on a pattern element of the other polarity. Insulative spacing between the pattern elements is typically designed to be large enough such that a foot of the UAV does not cause a short between adjacent pattern elements of opposite polarities or ground.

The landing platforms 2002 and floors 2006 of the various embodiments are preferably configured to contain structural elements and be composed of suitable materials so as to provide a weatherproof and/or weather-resistant landing pad to support the UAV and any associated parcels or equipment. For example, platform 2002 can include drainage holes, sloped edges to ensure precipitations do not pool on floor 2006. Similarly, floor 2006 can be composed of weather and rust resistant material such as polycarbonate, rubber, or other such material to withstand the elements.

Figure 5A:
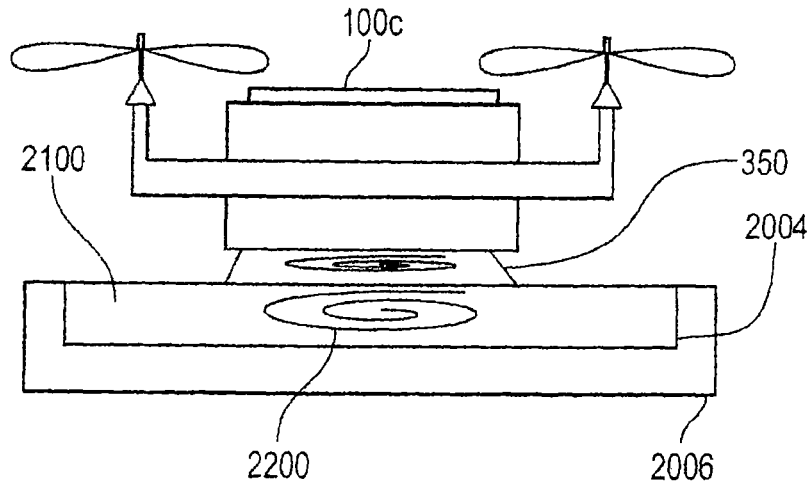
FIG. 5A is a side view in partial cross-section of a landing pad having an inductive charging plate and antenna for charging a UAV provided with a cooperating antenna and related circuitry.

Referring now to FIG. 5A, in operation, an inductive charging landing platform 2002 may receive a UAV 100c. As depicted, an inductive or other wireless battery charger 2024 may be deployed to charge the batteries of the UAV 100 while it is docked on the landing platform 2002. The wireless battery charger 2024 may implement any of a number of different wireless charging techniques including, for example, an inductive charger(s) 2100 using coils 2200 to induce current in a corresponding coil 350 in the UAV 100, through which cooperating frequency modulation circuitry (not shown) allows for the UAV battery to receive an appropriate charge as will be appreciated by one of ordinary skill in the art. Or as another example, battery charger 2004 can include a low-frequency electromagnetic radiation source 2400 that transmits its energy to a power-harvesting circuit 355 or toroidal coil assembly in the UAV.

Figure 5B:
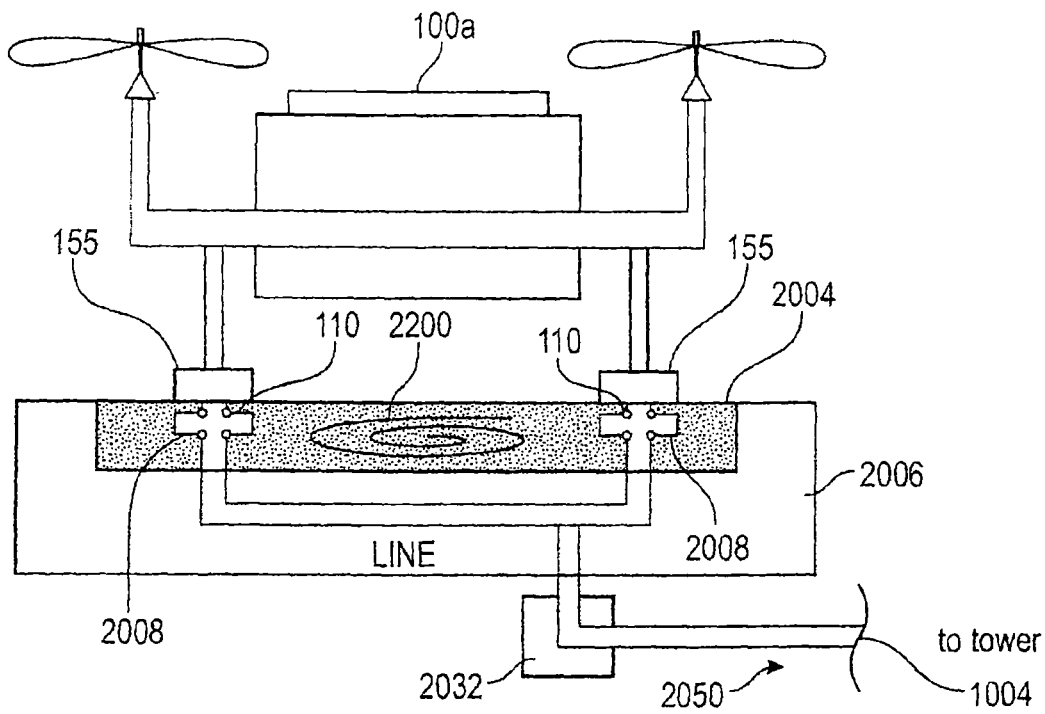
FIG. 5B is a side view in partial cross-section of a landing platform equipped with plug receptacles for receiving one or more charging plugs from a UAV and also an inductive charging plate.

Alternatively, as shown in FIG. 5B, wired connections can be made with the UAV by docking the UAV on floor 2006 such that electrical contacts on the UAV lineup with and connect to corresponding electrical contacts on platform 2002 akin to an electric toothbrush recharger or the like. Or alternatively, the floor may provide for direct connection of plug members 155 mating with one or more plug openings 2008 in the floor 2006 connected to line voltage.

In the above landing platform embodiments, simple parasitic siphoning of electricity to power the charging capabilities of the pads are contemplated given that the platforms are provided at locations along the electrical lines of the electrical grid and thus have a never ending supply of AC power. A power supply 2032 can be included to provide power to battery charger 2024 as well as to the communications equipment 2400 (described below). Power supply 2032 may include the appropriate AC to AC, AC to DC, DC to AC, or DC to DC power conversion components necessary to supply the appropriate power to the various devices. Configuring the power supply circuitry is well within the skill of one of ordinary skill in the art armed with the present specification.

Figure 6:
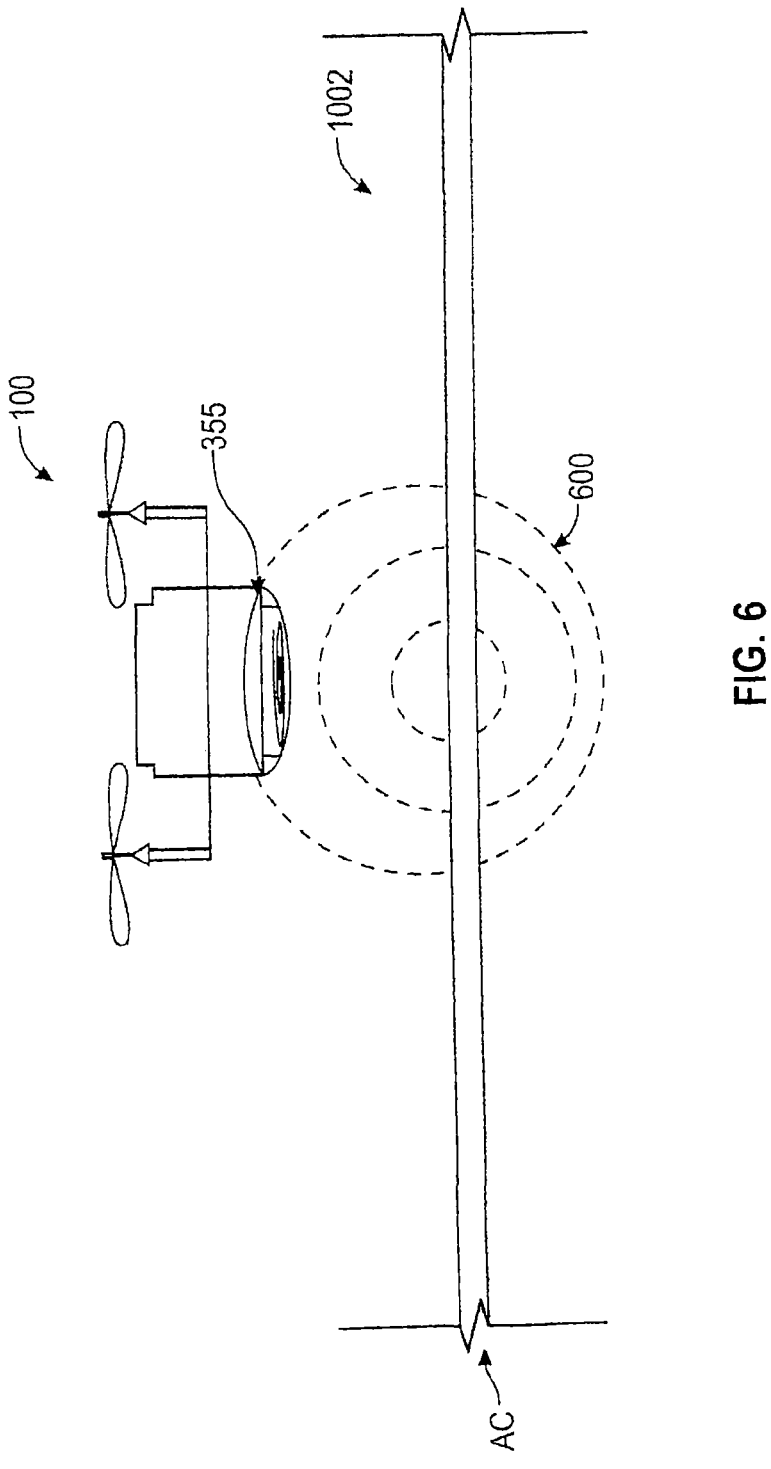
FIG. 6 is a side environmental view of a UAV equipped with a coil for inductive charging using the magnetic field generated by AC electricity flowing through transmission or power lines.

According to a preferred embodiment of the invention depicted in FIG. 6, the UAV is charged using the magnetic field generated by transmission and power lines carrying electrical current. Specifically, as will be appreciated, magnetic energy harvesting by surrounding an electrical wire with a toroidal core is well understood in the art as Farraday's law of induction applies. By bringing a coil within the magnetic field 600 generated by the power lines, a current is created and may be siphoned to recharge a battery. This embodiment may be preferred due to the lack of investment in infrastructure required. The thousands and thousands of miles of transmission and power lines crisis-crossing the country provide a readily available source of inductive electricity.

Understanding that the power generation is small and requires a drone equipped with a coil to travel in close proximity to the lines, provides various challenges as will be appreciated by those skilled in the art. In order to lessen the potential damage to the UAV and its electrical components through arcing or similar phenomena resulting in huge voltage spikes, the UAV may be configured to include a Farraday cage exoskeleton or housing or insulation for critical components.

The UAV may also be configured to allow for circuitry to dissipate voltage spikes. For example, a prior art technique would make use a spherical UAV body comprising a light weight, high strength plastic, or other suitable material, which is then coated with a metallized surface coat to shield the internal circuitry. The body of the UAV may be subdivided into eight spherical quadrants, four metallic patches bonded through a thin dielectric to the metallized surface of the UAV body in the four quadrants the upper half thereof. These patches, together with the dielectric separating them from the metallized surface, form four capacitors which are connected in parallel. Power conductor creates a charging current on these parallel connected capacitors through the air dielectric between the metallic power conductor and metallic patches forming capacitors, which are correspondingly parallel connected. An integrator, consisting of operational amplifier and gain control feedback capacitor has one input connected through a resistor and capacitor arrangement to the outer patch on the UAV body. The other terminal of the operational amplifier is connected to the metallized surface of the UAV body. The low input impedance of operational amplifier and high gain causes the charging current at the surface to flow through the electric field sensing circuitry and then through metallized surface to earth ground. Therefore, the operational amplifier will provide an output AC voltage which is proportional to the electric field strength at the spherical surface of the UAV. Since the UAV body is symmetric, and the voltage level of EHV conductors is closely controlled, the sum of the charging currents of all four parallel capacitors will remain essentially constant for a given power conductor voltage and distance between UAV and power conductor. Resistor is a current-limiting means to protect against fast rise time surges. Capacitor is relatively large e.g., 5-10 Mfd for AC power conductor monitoring, to block DC signals. Diodes are used to clamp the voltage across resistance-capacitance arrangement. Other diodes in turn clamp the voltage across the inputs of amplifier. Metal oxide surge suppressor protects the circuit components against damage due to momentary transients. The output signal representing the voltage value is compared with a preset, digitally derived reference voltage Vref at comparator, with feedback resistor. The differential output is fed to the flight control computer which maintains the RPD a fixed distance from the power conductor.

The recharging stations and/or UAV's also include the ability to communicate and coordinate. In various preferred embodiments, the recharging area will include a communications unit 2400. The communications unit may comprise one or both of the functionalities of communications with the grid and/or communications with the UAV traffic. As will be appreciated, it may be necessary or advantageous in certain embodiments to integrate the recharging area into the communications network of the electrical grid, or "smart grid." This may be important to prevent a landing UAV that will be drawing power from the grid to be perceived as a fault in the line causing the safety systems to isolate the perceived fault and black out the area. In a presently preferred embodiment, the communication unit, much like a recloser, can identify to the system that a landing UAV is not a fault and the safety systems do not need to shut down power to the line. In other embodiments, the recharging area may be configured to receive electrical power in a manner that removes it from having fluctuations being registered or identified by the grid's safety devices, for example, in a manner similar to lights provided on utility poles.

In embodiments wherein the communications unit communicates with the units to be recharged, any suitable means of communication and coordination should be understood to be within the scope of the invention. One of ordinary skill in the art armed with the present application can easily implement a communications network and protocol to achieve various advantages of the present invention. As will be appreciated, a communications network may serve many purposes, either as an integrated single device or central system having various functions or various discrete communications systems provided in the overall system where necessary or desired.

According to some embodiments of the invention, the communications unit 2400 may be a relatively simple system that allows for the recharging system to communicate information regarding a UAV using it for recharging. The communications unit may receive information sufficient to identify the UAV or its owner and track how much electricity was consumed in recharging to allow the system to invoice for the service. Similarly, the communications unit may separately, or in addition to identifying the UAV and consumption, communicate directly with an incoming UAV. The communications may be as simple as letting a UAV know that the charging area is free of traffic and open for landing. Alternatively, the communications may be more complex and involve two-way communications, scheduling, and the like.

In some embodiments, the communications system may communicate with [0075] the UAV only by reading an RFID tag or the like to identify the UAV and its requirements. In other embodiments, the UAV and charging area may communicate using radio, Wi Fi, PLC, or long-range systems to coordinate location and even scheduling and the like. In some embodiments, the UAVs and charging stations are part of an integrated communications network that allows the locations of the charging stations and their status communicated to UAVs and/or as part of an overall air traffic control system configured to track UAVs, their travel, and their recharging.

In a presently preferred embodiment, the communication system is configured to communicate with both the electrical grid and the UAV/UAV traffic. Communications with the UAV traffic is preferably multifaceted as discussed above. The communications with the electrical grid is similarly multifaceted as part of the "smart grid" or a SCADA to coordinate with safety equipment to prevent false alarms and well as track their usage and their overall health for preventative maintenance and replacement.

As will be appreciated by one of ordinary skill in the art armed with the present specification, UAVs traveling in the proximity of power lines provides an opportunity to gather data not normally available for most of the electrical grid. In this context, "in proximity to a power line" means within 400 yards horizontally from the power line. A UAV may be considered in proximity to a power line at any elevation above or below the power line, so long as it is within 400 yards horizontally from a vertical line extending up and down from the powerline. The more prolific the traffic—whether through a single UAV having a regular flight path, or through swarms of UAVs traversing power lines throughout the world—the more expansive the data set and the more robust the training for a machine learning module of an artificial intelligence system.

For example, visual data in either (or both) real time and historically collected information provides data for determining the probability of a vegetation related event affecting power lines from encroaching foliage, dying foliage, and weather conditions. Similarly, a large data set of similar foliage encountered by other UAVs that led to an unwanted event can be used to train the system on how to identify high probability risks for similar events. If the probability exceeds a predetermined threshold risk, the system could create cause an action, such as a communication message to the local power company that preventative service is warranted. The type of information or measurements included in the data set and variables such as visual, infrared, magnetic detection, detection of sparks or arcing, weather conditions, type of foliage, condition of foliage, seasonal patterns of foliage, nesting wildlife, etc. for inclusion in the model may be varied to optimize the objective of the model—e.g., to predict problem areas, detect faults, extrapolate foliage growth or the like.

Similarly, the data collected can be predetermined and collected by equipping the UAVs with data collectors. Such data collectors include various types of sensors for collecting data during flight operations. The various data collector sensors may include one or more cameras configured to sense or detect visual images—either moving images or still images—at human visual bandwidths, infrared or ultraviolet bandwidths. The various data collector sensors may also include detecting or measuring any of current, voltage, sparks, heat, magnetic levels, magnetic flux direction, magnetic perturbations, heat anomalies, sound, distance from the UAV and/or angle from the from the UAV (relative to horizontal or vertical). The data collectors may also collect operational data from the SCADA 700 or safety equipment associated with the powerlines that record events and anomalies such as transient spikes, faults, and similar occurrence common in power distribution systems. The data may be gathered during the UAV's flight, or while the UAV is parked on a landing platform such as recharging platform 2002 of FIG. 1.

The multiple data streams of different sensors can be extremely valuable as the Venn diagram of predetermined markers of events can be used to aid the identification and prediction of certain events. Such events may include things such as weather-specific hazards, nesting wildlife, deteriorating equipment, or electrical anomalies that may be present in one but not others of the data streams or more than one of the data streams from the sensors. Over time, variable will be weighted through the machine learning process to better predict the likelihood or risk of corresponding events.

The collected data is uploaded from the UAV to the system where it is saved in a computer memory or other data storage device. The collected data may be stored in a data library that includes one or more databases or other computer files for data analysis in order to identify and draw conclusions about the likelihood of a vegetation related hazard to a power line. A prediction model may be used to predict a vegetation related hazard likely to damage a power line. The prediction model may be based on one or more machine learning algorithms and/or automated data analysis, as discussed below in conjunction with FIG. 7. For example, the system may compare historical data of vegetation growth to extrapolate (or predict) the growth to a point likely to damage a power line within a given time frame. Images can be analyzed to identify dead or dying trees or other vegetation within a predefined distance of power lines. Microphones may be used to collect sound, and the data of the sound may be analyzed to detect woodpeckers-a likely sign of dead branches in a tree. The images can be analyzed to detect broken or damage branches that are likely to fall due to decay over time or an increased amount of wind.

In this context the phrase "vegetation related hazard likely to damage a power line" is defined in various implementations to mean exceeding predetermined threshold of: a 0.5% or greater chance of causing a power line hazard within 6 months; a 0.1% or greater chance of causing a power line hazard within 6 months; or a 0.5% (or 0.1%) or greater chance of causing a power line hazard within 6 months (or within 3 months). Various implementations may use other combinations of percent chances within other various time frames, e.g., 1.0% or greater, 0.01% or greater, or 0.001% or greater in combination with any of 1 month or less, 2 months or less, 1 year or less, 18 months or less, or 2 years or less. The various predetermined thresholds over given time frames are determined by machine learning applied to data gathered over time, e.g., gathered over periods of at least five times the given time frames for at least 1000 locations on a power line.

Preferably, UAV data sets can be used in conjunction with other data gathered from other sources such as the safety and recording equipment, SCADA 700, and monitors used in the normal operations of the electrical grid.

Occasionally a UAV may detect data (e.g., a visual image) that could possibly be a power line hazard, but the data is ambiguous or incomplete. In such instances the system may be programmed to circle the UAV around in one or more passes at closer proximity or at different angle(s) for a better view or better conditions for collecting data. The system may also, or alternatively, be programmed to employ one or more different types of sensors or other data collectors in the additional passes to gather data.

Figure 7:
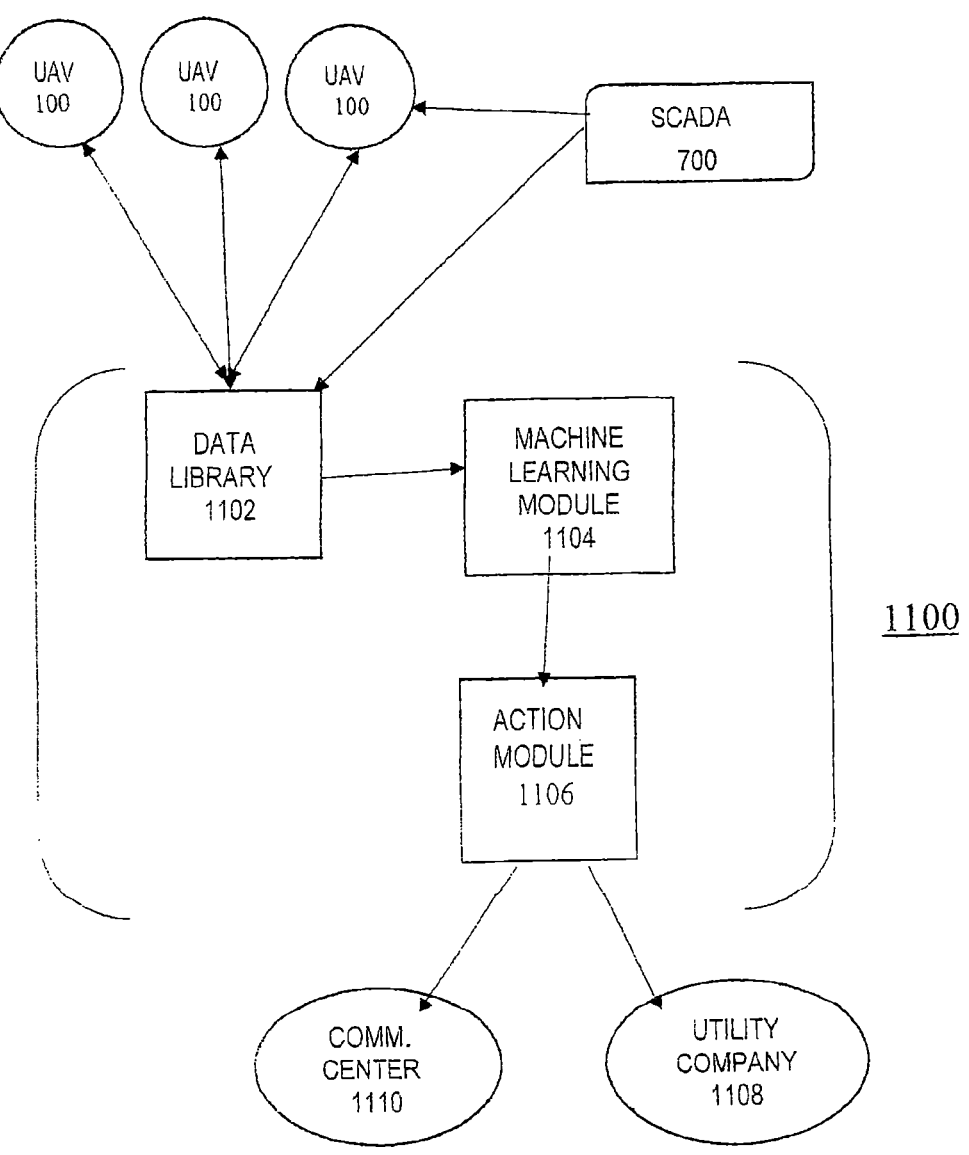
FIG. 7 illustrates a machine learning and analysis system suitable for use with various embodiments of the disclosure.

In the context of the present disclosure, as shown in FIG. 7, the machine learning algorithm and automated data analysis may be implemented in a system 1100, also known as an artificial intelligence (AI) system. System 1100 includes a data library 1102 for storing data sets, machine learning module 1104 for executing one or more machine learning algorithms or functions on data sets received from library 1102 and outputting a prediction and/or recommendation based on the received sets, and an action module 1106 for receiving the output (e.g., predictions and/or recommendations) from machine learning module 1104 and performing or recommending an action based on the output.

It is to be appreciated one or more components of system 1100 may be implemented in any of the UAVs described above, wherein data library 1102 may be incorporated in one or more memories of the UAV and modules 1104, 1106 may be software (e.g., stored on one or more memories of the UAVs) executed by one or more processors of the UAV. Alternatively, one or more components of system 1100 may further be incorporated in one or more servers and/or a dedicated UAV servers for all UAV data and any other sources of data for the system. The server incorporating system 1100 may be in communication with one or more UAVs 100 via a communications link for transmitting data collected from the sensors to the system 1100. In this way, actions performed by module 1106 based on inputs from module 1104 may include communication signals (including alerts, notifications, control signals, and messages) to electrical utilities 800 notifying them of potential events.

It is to be appreciated that the data in data library 1102 may be received from the central cloud server housing data from all sources of the system, one or more UAVs, or any other sources. In one embodiment, each of the UAVs 100 may provide various data to a server including library 1102. In another embodiment, various data may be collected from each of the UAVs 100 by an aggregator and then provided to a server or the system 1100. Preferably, the server is in communication with the SCADA 700 of the electrical grid so additional data may be supplied to the system 1100.

One machine learning algorithm that may be used by module 1104 is one which takes a set of input values from library 1102, transfers those values though a connected graph of nodes, here called a network, where each node applies a summation function between its inputs, and applies a weighting function on the output, to generate a set of output values to be provided to action module 1102. In such a network, during the training phase, the value of the weighting function is adjusted to make the known input set match the known output set. Such an algorithm is often called an Artificial Neural Network, or ANN. One example of an Artificial Neural Network may be a set of visual, heat, and magnetic data gathered by data collectors o other UAV sensors provided to module 1104 by library 1102, which include data gathered and identified as corresponding to an anomaly or event of interest, and a single output value outputted by module 1104 that gives the probability of a matching criteria of interest and if above a predetermined threshold, action module 1106 may send a communication signal to one or more clients indicating the potential existence of the event so it may be further investigated, mitigated, or remedied.

Another algorithm that may be used by module 1104 is one that applies a second algorithm to compute the error contribution of each node in an Artificial Neural Network, often called the loss function, and then applies the determined loss function to adjust the weighting function of each node. Such an algorithm is often called a Backpropagation, and can be used by module 1104 to adjust the network to find the local optimal solution to an input-output problem.

Another algorithm that may be used by module 1104 is one that layers Artificial Neural Networks together, such that the set of outputs from one layer are the inputs to the next layer, with one or more layer between the initial input and final output, often called hidden layers, and that each layer can be trained individually to improve the overall performance. Such a layering of networks will be referred to as a Deep Learning, or a Deep Neural Network. One example may be a network where the first layer is trained to classify visual anomalies or hazards which is fed into a second layer that identifies possible sources or probabilities of trouble from such anomalies or hazards, which is fed into a third layer that identifies the most outcome, timeframe, or conditions where an anomaly or event is detected may be a concern.

Another algorithm that may be used by module 1104 is one in which nodes in layers are only connected to the nearest, but which stack nodes in a layer to a configured depth, and in which take a small condensed output of a previous layer as input to all nodes depth-wise in the layer, but only a small segment width and breadth wise, thus giving spatial locality to the input. Such a layer will be referred to as a Convolutional Layer, and such an algorithm a Convolutional Neural Network, and would improve performance for inputs where spatial locality is significant. One example may be to use as input from library 1102 a series of visual data of foliage in proximity of powerlines and electrical anomalies caused by foliage in occasional contact with the powerlines, and as output of module 1104 the probability of an electrical outage in a weather event.

Another algorithm that may be used by module 1104 is one in which the outputs of some nodes are fed as inputs to previous layers, adjusting algorithm parameters, thereby adjusting the result over a temporal sequence of input sets during detection. Such an algorithm is often called a Recurrent Neural Network. One example may be a sequence of visual, magnetic, or electrical data (i.e., measured by one or more UAVs) inputted to module 1104 via library 1102 to predict what certain weather conditions, nesting animals, or other events affect the local grid over time. The predication may be outputted to action module 1106 and action module 1106 may communicate the predicted event probability to electrical companies to schedule a maintenance or remediation program.

Another algorithm that may be used by module 1104 is one that starts with a set of randomized solution functions, picks the solution that best maps the input to the output, often called selection, creates a set of random changes to that solution, often called mutations, and test those solutions. This cycle of selection and mutation, which is repeated until an optimal solution to the problem is found, will be referred to as a Genetic Algorithm, or an Evolutionary Algorithm.

In addition to the various algorithms described above, the module 1104 may employ other algorithms or functions including, but not limited to, linear regression, logistic regression, linear discriminant analysis, classification and regression trees, naïve bayes, k-nearest neighbors, learning vector quantization, support vector machines, bagging and random forest, boosting and Adaboost, etc.

One set of data stored in library 1102 that may be used as input to such algorithms in module 1104 may be a meter's or UAV's live readings. One example may be to use sensor data, such as, but not limited to, visual, electrical and magnetic data gathered during the UAV's flight or while the UAV is recharging. Another set of data stored in library 1102 that may be used as input to such algorithms in module 1104 may be data received on the SCADA 700 or safety equipment associated with the powerlines that record events and anomalies such as transient spikes, faults, and similar occurrence common in power distribution systems.

Accordingly, a UAV equipped to communicate with the SCADA and also having visual, audible, magnetic, and heat sensing capabilities combined with local weather data provides a robust data library for training a machine learning machine to identify phenomena and events of interest to help maintain the electrical grid when it comes to tasks such as forest management, preventative tree trimming, wildlife management, weather priorities, and routine maintenance activities by allowing early identification of high probability or real time events and phenomena of interest.

Referring to FIG. 8, a flow chart of a preferred method for using the machine learning system 1100 of FIG. 7 is depicted. As shown, in step 1202 a plurality of data sets are stored in a data library 1102. The samples are received from the various sensors and sources described above and communicated to the data library. The UAV may be configured to upload (or download) or otherwise communicate to the system upon completing its flight, and/or may communicate the data at a recharging station during its trip. The data may include images—still or moving—of vegetation which is in a condition likely to damage the power line. Such a condition may be called a vegetation related hazard. Potential vegetation related hazards may be identified either by the system—e.g., by machine learning module 1104—or by the UAV. Upon identifying a vegetation related hazard the UAV may be directed to alter its route to collect further data—e.g., images—from a different perspective or from a closer distance. Other UAVs may also be directed to gather data of the potential vegetation related hazard as well.

In step 1204, machine learning module 1104 receives data from the data library 1102. In step 1206, machine learning module processes the data in accordance with at least one machine learning algorithm as described above. In step 1208, based on the processing of the data received, machine learning module outputs at least one prediction and/or recommendation. In step 1210, the prediction and/or recommendation is received by the action module 1106.

Figure 9:
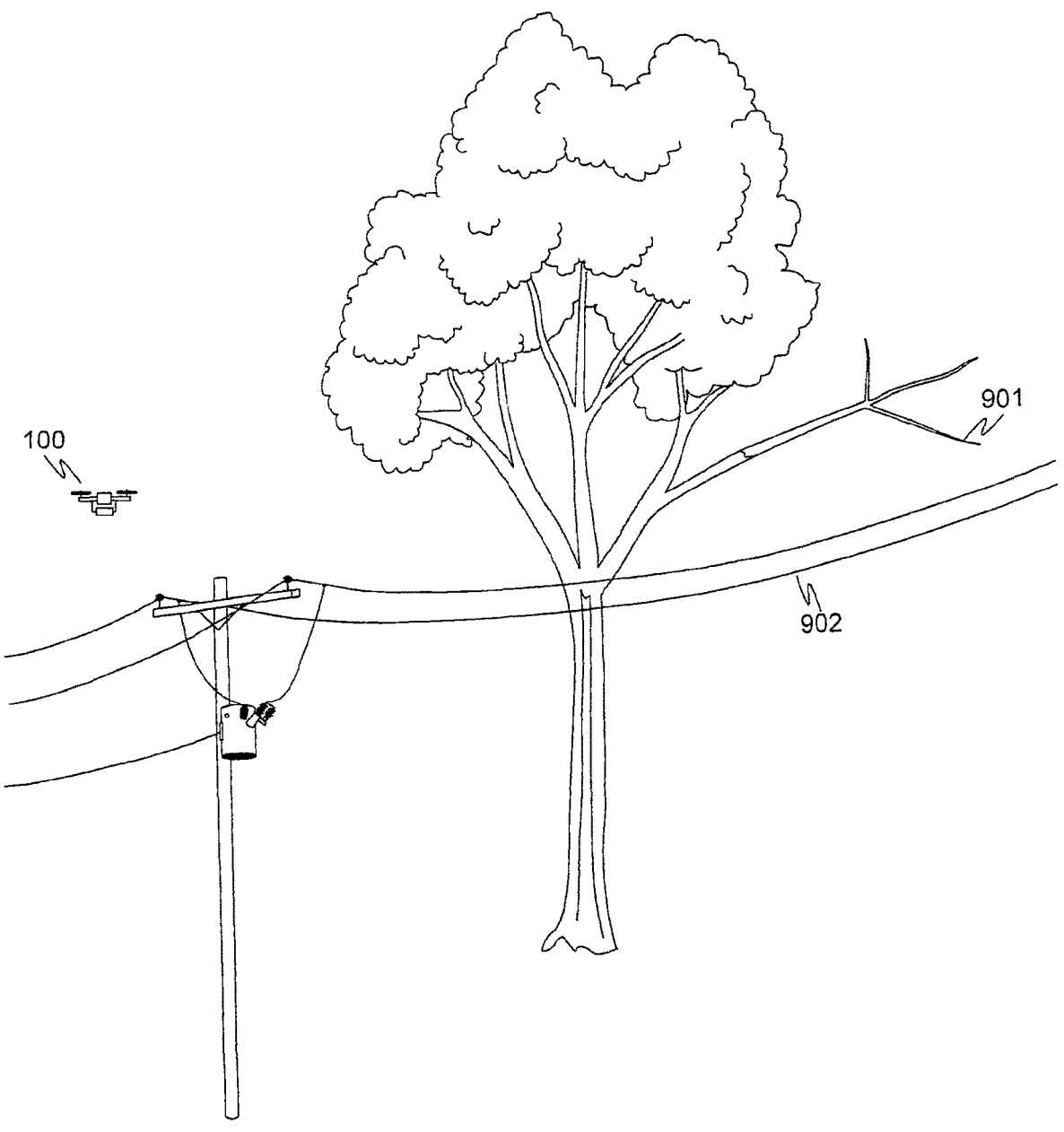
FIG. 9 depicts a UAV detecting a possible vegetation related hazard according to various embodiments.

In step 1210 or 1212, the action module 1106 may determine if an output prediction or recommendation exceeds a given threshold or otherwise perform at least one action based on the recommendation and/or prediction. In step 1212, the action module 1106 performs at least one action such as providing a communication signal to the power company 1108 or communication center 1110 or other predetermined recipient advising a course of action or probability of an adverse event so maintenance and remediation decisions may be made. The communication typically includes the location of the vegetation related hazard. The communication may also include a photograph of the vegetation related hazard to help maintenance workers find the vegetation related hazard. The UAV used to capture the photographic image may be flown close to the ground so the photograph will be taken from the perspective of someone looking up to identify the vegetation related hazard. For example, FIG. 9 depicts a UAV 100 flying low to detect a possible vegetation related hazard—the dead branch 901 which is relatively close to power lines 902 In some embodiments the photograph is taken from an elevation beneath the vegetation related hazard. In other embodiments the photograph is taken from an elevation level, to withing plus or minus 5 degrees, of the vegetation related hazard. In yet other embodiments the photograph is taken at an angle no greater than 15 degrees looking down toward the vegetation related hazard, and in other embodiments at an angle of no greater than 30 degrees looking down.

Some of the various embodiments involve UAVs flying (or landing/taking off) in the proximity of power and electrical lines. For the purposes of this disclosure, the term "proximity" as it relates to UAVs in relation to power and electrical lines is defined in various embodiments to be any of 1000 feet or less, 500 feet or less or 200 feet or less in any direction. In other embodiments the term "proximity" as it relates to UAVs in relation to power and electrical lines is defined to be any of 1000 feet or less, 500 feet or less or 200 feet or less in a horizontal direction and no greater than 1 mile in a vertical direction. Some of the various embodiments involve UAVs transmitting real time data from a UAV. In some embodiments the phrase "real time data" means data that is streamed immediately as it is being captured. In other embodiments the "real time data" is sent within 10 minutes of capturing it on the UAV. In other embodiments the phrase "real time data" in this context means data that is sent during the current flight of the UAV—that is, before the UAV lands at its final destination for the flight. The phrase "a vegetation related power line hazard" is a state of vegetation or a vegetation condition that is causing, or likely to cause, a short between two power lines, or between a live power line and ground (or any other structure or plant). A plant—e.g., a tree branch—may not itself give rise to a short due to its insulative properties. However, foliage or other vegetation (e.g., a tree branch) spanning power lines or having grown or fallen to a point nearby a power line (e.g., within five feet, directly above or close enough to fall on the power line) does typically produce a vegetation power line hazard since such vegetation would gain conductive properties in precipitation conditions such as rain, snow or ice.

The above embodiments are for illustrative purposes and are not intended to limit the scope of the invention or the adaptation of the features described herein to particular use, field, or environment. Those skilled in the art will also appreciate that various adaptations and modifications of the above-described preferred embodiments can be configured without departing from the scope and spirit of the invention. Therefore, it is to be understood that the invention may be practiced other than as specifically described.

What is claimed is:

1. A method for identifying a vegetation condition endangering a power line, the method comprising:
   providing one or more data collectors on a UAV;
   collecting data with said one or more data collectors while the UAV is travelling in proximity to the power line;
   receiving data from the UAV;
   receiving operational data from a Supervisory Control and Data Acquisition (SCADA) system associated with the power line, wherein said operational data includes records of electrical anomalies or faults;
   identifying a vegetation related hazard likely to damage the power line by correlating the data collected by the UAV with said operational data from the SCADA system;

determining a probability of the vegetation related hazard occurring within a predefined amount of time based on extrapolating vegetation growth data from historical observations;
   determining when said probability exceeds a predetermined threshold;
   wherein said UAV is one of a plurality of UAVs that traveled in proximity to the power line across different geographic regions of an electrical grid, the method further comprising:
   building a prediction model based on pooling historical data from visual and non-visual data collectors associated with the plurality of UAVs that traveled in proximity to the power line to train the prediction model with data reflecting varying environmental conditions; and
   wherein the prediction model determines the probability of the vegetation related hazard occurring within said predefined amount of time.

2. The method of claim 1, further comprising: receiving data from the UAV comprises uploading the data from the UAV to a system comprising a data library.

3. The method of claim 2, wherein the one or more data collectors include a camera configured to capture still visual images.

4. The method of claim 3, wherein the data received from the UAV is real time image data.

5. The method of claim 1, wherein the UAV includes a locating component comprising at least one of a magnetic detector and a heat detector configured to detect electromagnetic signatures of the power line for navigation along the power line in coordination with a stored map of the electrical grid.

6. The method of claim 1, wherein said UAV is one of a plurality of UAVs that traveled in proximity to the power line, the method further comprising: storing a machine learning module on server, wherein the machine learning module builds the prediction model based on said historical data.

7. The method of claim 1, further comprising: sending a communication to a predetermined recipient, the communication including a location of the vegetation related hazard.

8. The method of claim 7, wherein the communication includes a photograph taken from an angle no greater than 15 degrees looking down toward the vegetation related hazard.

9. A system configured to identify a vegetation condition endangering a power line, the system comprising:
   a UAV configured to fly in proximity of the power line;
   one or more data collectors on the UAV, wherein the UAV is configured to collect observational data from the power line during one or more flights using said one or more data collectors;
   a server having a machine learning module for receiving said observational data from said UAV and receiving operational data from a SCADA system associated with the power line, and calculating a probability of a vegetation related hazard occurring within a predefined amount of time by correlating said observational data with said operational data and determining whether the probability is above a predetermined threshold;
   a communications link from said server for communicating information about the vegetation related hazard to a predetermined recipient;
   wherein the predetermined recipient is a utility company, the system further comprising:

a prediction model built by the machine learning module and stored on said server, the prediction model built by pooling observational data from a plurality of UAVs operating across different geographic regions of an electrical grid, said prediction model including historical data from said one or more data collectors; and wherein the prediction model determines the probability of the vegetation related hazard occurring within said predefined amount of time.

10. The system of claim 9, wherein said information in the communication includes a photograph taken from an angle no greater than 15 degrees looking down toward the vegetation related hazard.

11. The system of claim 10, wherein said UAV is one of a plurality of UAVs that traveled in proximity to the power line collecting historical data with a respective plurality of data collectors.

\* \* \* \* \*